Sept. 20, 1966  S. L. KOUTZ ETAL  3,274,068
FUEL ELEMENT

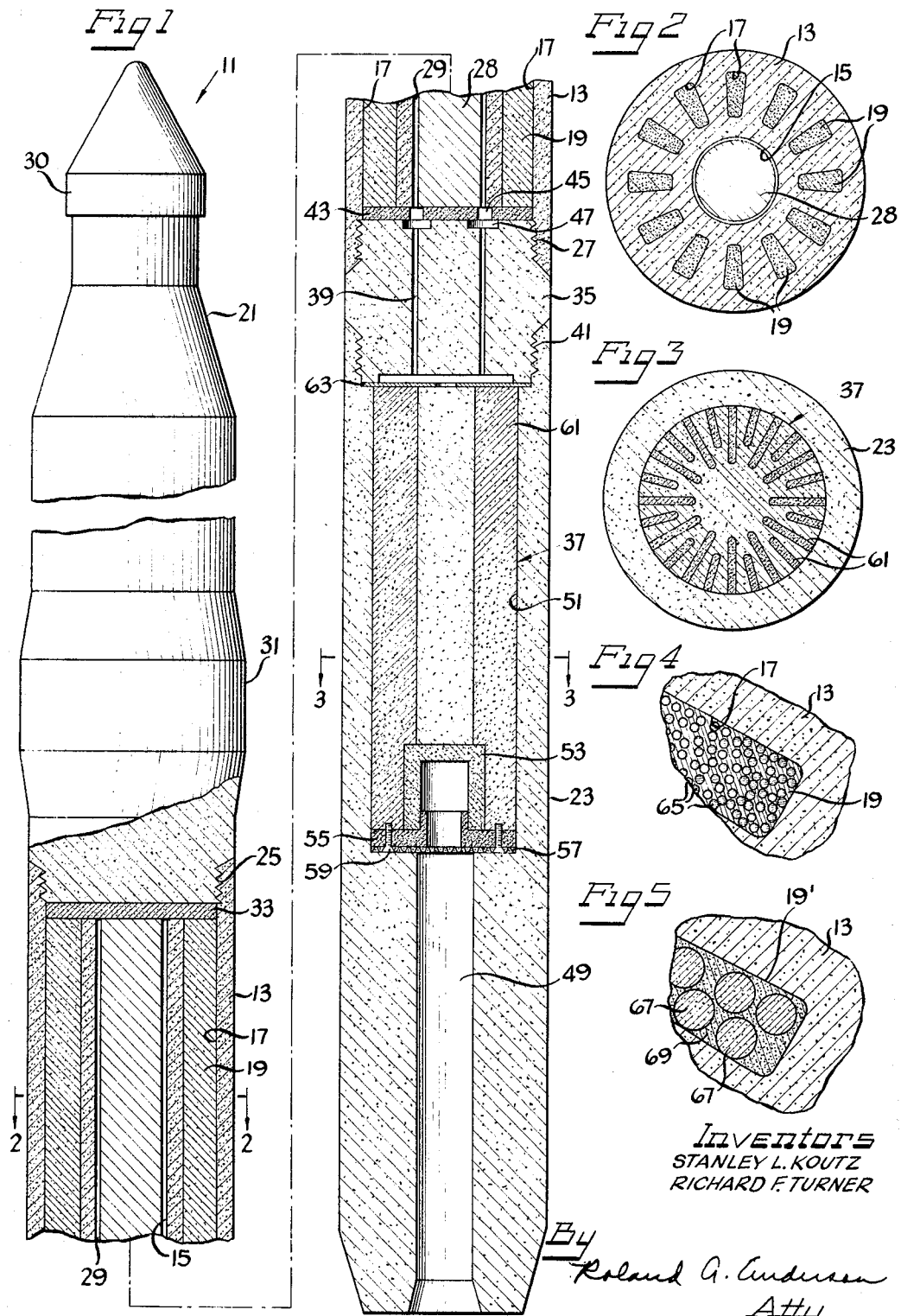

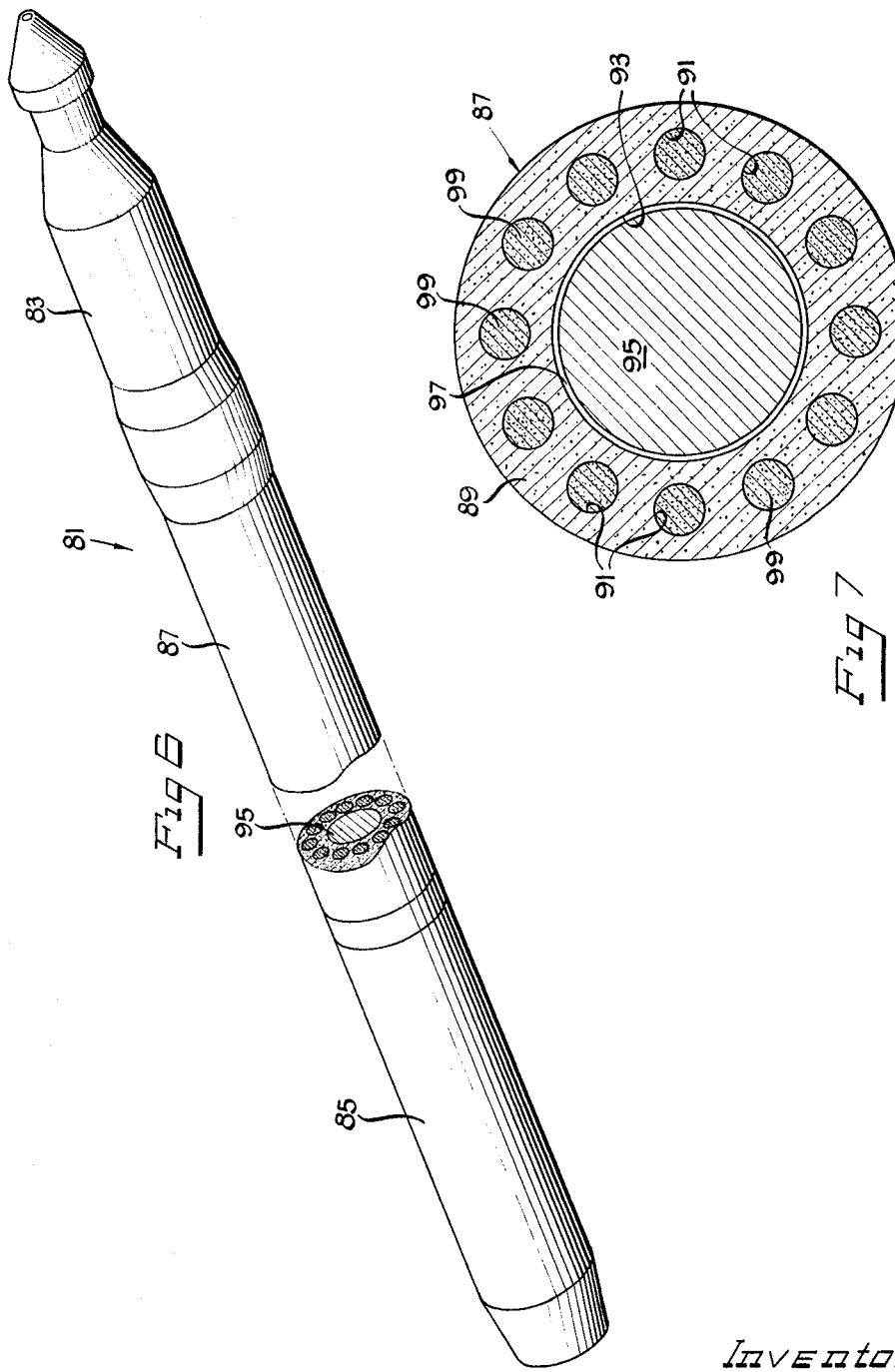

Filed July 22, 1964  3 Sheets-Sheet 3

Inventors
STANLEY L. KOUTZ
RICHARD F. TURNER

By
Atty

United States Patent Office 3,274,068
Patented Sept. 20, 1966

3,274,068
FUEL ELEMENT
Stanley L. Koutz and Richard F. Turner, San Diego, Calif., assignors, by mesne assignments, to the United States of America as represented by the United States Atomic Energy Commission
Filed July 22, 1964, Ser. No. 384,564
11 Claims. (Cl. 176—69)

This application is a continuation-in-part of application Serial No. 365,221, filed May 5, 1964, now abandoned.

The invention described herein was made in the course of, or under a contract with the U.S. Atomic Energy Commission.

This invention relates to fuel elements for use in nuclear reactors and more particularly to improved fuel elements for use in high temperature gas-cooled nuclear reactors which operate at high power levels.

In nuclear reactors which operate at high power levels and which utilize a fluid coolant to extract the heat from fuel elements in the reactor core, it is important to obtain efficient heat transfer from the fuel in the fuel elements to the coolant stream. The more efficient heat transfer characteristics a fuel elements has, the lower the fuel temperature in this element may be maintained to transfer to the coolant stream a given quantum of heat per unit time. Lower fuel temperatures mean longer fuel life and, consequently, lower reactor operating cost.

In addition to good heat transfer characteristics, the fuel elements should be designed to remain stable at the operating temperatures over extended periods of use in the core of an operating nuclear reactor. Moreover, as in any apparatus for the generation of useful power, cost is also a significant factor. Thus, the design of the fuel element should achieve the desired stability without requiring expensive manufacturing costs. Consequently, fuel element designs should be fairly uncomplicated so as not to necessitate difficult machining or assembly operations.

A further consideration in the design of nuclear reactors to be operated at high power levels is the reduction of internal losses within the reactor core which reduce the efficiency of the power output of the reactor. Many of the fission products which are created by the fissioning of nuclear fuel are poisons, i.e. isotopes with a relatively high neutron capture cross section in the energy range within which the reactor is operating. These fission product poisons lower the neutron density of the reactor core. To maintain a neutron population within the core, these neutron losses must be compensated by higher rates of fuel burn-up resulting in a loss in operating efficiency. It is desirable to reduce these losses by ridding the core of fission product poisons.

In gas-cooled reactors, it is known to divert a minor portion of the flow of gas from the main coolant stream and pass this purge gas over the fuel. This purge flow is effective to carry fission products which have migrated from the nuclear fuel into a "hot" trap within the fuel element and/or into a manifold which leads out of the fuel elements into one or more exterior traps. However, these purge gas systems are designed merely to prevent radioactive fission products which escape from the fuel from reaching and contaminating the main coolant stream. In fuel elements of this type, the primary fission product containment is in the nuclear fuel itself, with coated particles often being used. In such cases, the purge gas systems usually remove only a few percent of the fission products created. It is desirable to improve fuel element operating characteristics by removing therefrom a much higher percentage of these fission-product poisons.

It is a principal object of the present invention to provide novel fuel elements having improved operating characteristics. It is another object to provide fuel elements having improved characteristics for the transfer of heat from the fuel to the reactor coolant and a method for making such elements. It is a further object to provide fuel elements for use in high temperature, gas-cooled nuclear reactors which facilitate the removal of a relatively high percentage of the fission product poisons produced therewithin. A still further object is the provision of fuel elements which are stable at operating temperatures and which can be inexpensively constructed.

These and other objects of the invention are more particularly set forth in the following detailed description and in the accompanying drawings wherein:

FIGURE 1 is an elevational view, partially broken away and partially in section, of a fuel element embodying various of the features of the invention;

FIGURE 2 is a sectional view taken along line 2—2 of FIGURE 1;

FIGURE 3 is a sectional view taken along line 3—3 of FIGURE 1;

FIGURE 4 is a fragmentary, enlarged view of a portion of FIGURE 2;

FIGURE 5 is a fragmentary, enlarged view of another embodiment of the fuel element;

FIGURE 6 is a perspective view of a further fuel element embodying various features of the invention;

FIGURE 7 is an enlarged sectional view taken along line 7—7 of FIGURE 6; and

Figure 8:
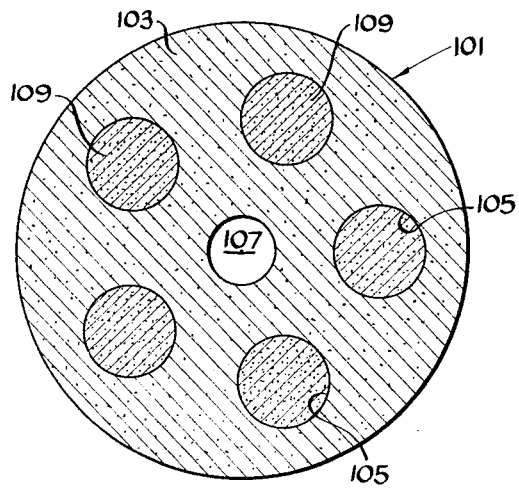
FIGURES 8 through 11 are views similar to FIGURE 7 of alternate embodiments of fuel elements.

One type of fuel element particularly well suited for use in a high temperature gas-cooled nuclear reactor that is designed to operate at high power levels is illustrated in FIGURES 1 through 4. Generally, the fuel element 11 comprises an elongated body section 13 having a central bore 15 extending longitudinally therethrough. A plurality of holes or chambers 17 which each contain a body of nuclear fuel material 19 are provided in the body section 13, extending longitudinally therethrough, parallel to the bore 15. For the purposes of this application, the term "nuclear fuel" should be understood to refer to either fissile materials, such as uranium 233, uranium 235, plutonium 239, etc. or compounds thereof, and fertile material, such as thorium 232 uranium 238, etc. or compounds thereof. The body section 13 is made of a material having a fairly high thermal conductivity, such as dense graphite, to assure good heat transfer from the fuel chambers 17 to the outer surface of the body section, whereat transfer to the coolant stream takes place.

It has been found that the use of fuel chambers 17 having non-circular cross sections, rather than circular cross sections, improves the heat transfer characteristics of the fuel element 11. Because the body of nuclear fuel material 19 has a lower thermal conductivity than the dense graphite which surrounds it, there is less heat lost in travel through the graphite than there is through the nuclear fuel material.

It has also been found that the heat transfer characteristics of the fuel element 11 can be further improved by increasing the thermal conductivity of the body of nuclear fuel material 19 which fills the fuel chambers 17. Although there are advantages which flow from the use of a packed bed of fuel particles in a fuel element of this type, there is in the neighborhood of about 30 percent of volume of a packed bed of fuel that is not occupied by the particles when spherical fuel particles having generally the same diameter are used. It has been found that by mixing fuel particles with a substance having a fairly high thermal conductivity to form a paste, the void space between the fuel particles is filled and conduction of heat from the fuel material 19 to the body section 13 is achieved.

It has also been found that good heat transfer between the fuel material and the body section 13 can be obtained even though a body of nuclear fuel material 19 is utilized which releases a substantial percentage of the fission products created therewithin. Concurrent with the release of fission products, there is recoil damage to the material into which the fission product recoils. By forming small packets with the fuel particles dispersed therewithin and disposing these packets in a supporting matrix, it has been found that substantially all the damage resulting from recoil of fission products into regions outside the fuel particles themselves is restricted to the packets. Thus, the supporting matrix remains structurally strong and dimensionally stable and continues to provide good heat transfer from the body of nuclear fuel material 19 to the body section 13.

Referring now in detail to the specific drawings, the fuel element 11 comprises the body section 13 disposed between a top reflector 21 and a bottom connector 23. The fuel element 11 is designed to be disposed vertically in a nuclear reactor with its primary point of support being at the bottom connector 23. Because the fuel element 11 is designed for use in a gas-cooled nuclear reactor, it will be described and discussed in conjunction therewith. However, it should be appreciated that various of the features of the fuel element 11 are likewise applicable to fuel elements for other types of reactors. The HTGR (high temperature, graphite moderated, gas-cooled reactor) is one example of a reactor of this general type and is described in Nucleonics, vol. 18, No. 1, pp. 86–90, January 1960.

The body section 13 is constructed preferably of a moderating substance, and as graphite, which is stable, has good thermal conductivity and is structurally strong under reactor operating conditions. The central bore 15 and the plurality of longitudinally extending, spaced-apart fuel chambers 17 may be provided in the body section 13 in any suitable manner, e.g. as by machining from a cylinder of graphite. However, the annular body section 13, complete with fuel chambers 17 and central bore 15, can be extruded, and this is the preferred method of construction. Extrusion eliminates most expensive machining operations, and it lends itself to the production of fuel chambers 17 of any desired cross sectional configuration.

To keep the outer surface of the body section 13 at a uniform temperature, the geometric centers of the fuel chambers 17 are disposed on a circle concentric with the outer perimeter of the annular body section 13. Internal threads 25, 27 are provided at the top and bottom, respectively, of the body section 13 to join it to the top reflector 21 and bottom connector 23.

The fuel element 11 utilizes a purge flow of gaseous coolant radially inward from the entire outer lateral surface of the body section 13. Accordingly, the porosity of the body section 13 is closely controlled to establish the desired purge gas inflow, as will be described hereinafter.

The bore 15 of the fuel element 11 serves both as a passageway for the purge gas flow and as a housing for a central moderator 28. In the illustrated embodiment, the central moderator 28 is in block form, including a plurality of cylindrical lengths of a suitable moderator, such as beryllium oxide, beryllium carbide, etc. BeO is preferred and is used in cylindrical lengths which are proportioned to have diameters about 0.080 inch less than the internal diameter of the bore 15 so that an annular purge gas passageway 29 about 0.040 inch in thickness is provided between the central moderator 28 and the body section 13 which extends the full length of the body section. If it is desired to utilize an all graphite moderator instead of beryllium oxide, the bore 15 may be narrowed to a central hole of much smaller diameter so the additional graphite in the interior of the body section takes the place of the BeO central moderator 28.

The top reflector 21 is made of graphite and is machined to have a grappling knob 30 at its upper end which is designed to be grasped by a fuel element handling device (not shown). A spacer ring 31 is provided intermediate the ends of the top reflector 21. The spacer ring 31 serves to laterally abut spacer rings on adjacent fuel elements when the elements are arranged within a nuclear reactor core. These rings 31 assure minimal spacing between adjacent fuel elements 11 and provide lateral support for the elements. If desired to prevent bowing of the body section 13 at the high temperatures at which the fuel elements 11 are designed to operate, additional spacing rings (not shown) may be provided intermediate the ends of the body section 13. Such spacer rings can be provided in any suitable manner, as for example, by laying-up pitch-impregnated graphite cloth upon an extruded graphite piece and baking. The lower end of the top reflector 21 has external threads machined thereon which mate with internal threads 25 provided at the upper end of the body section 13. A thin graphite disc 33 closes the upper ends of the bore 15 and of the fuel chambers 17 and serves as a gasket between the top reflector 21 and the body section 13.

The bottom connector 23 includes a coupling element 35 by which it is connected to the lower end of the body section 13. The coupling element 35 is provided to allow assembly of a trap 37 inside the bottom connector 23 and contains a plurality of passageways 39 which register with the annular passageway 29 and provide communication between the bore 15 and the trap 37. External threads on both ends of the coupling element 35 mate with the internal threads 27 on the bottom of the body section 13 and with internal threads 41 on the lower part of the bottom connector 23. A porous graphite disc 43 is disposed between the body section and the coupling element 35 and closes the bottom ends of the fuel chambers 17. A plurality of holes 45 drilled through the disc 43 register with the annular passageway 29 in the bore. An annular recess 47 in the upper end of the coupling element 35 eliminates the need for alignment of the disc 43 with the passageways 39 in the coupling element 35 to provide communication between the bore 15 and the trap 37. The lower end of the bottom connector 23 contains a central hole 49 which receives a hollow standoff pin (not shown) that positions the fuel element 11 in the reactor core. The bottom of the hole 49 is enlarged to facilitate engagement between the pin and the bottom connector 23. A cylindrical cavity 51, larger in diameter than the hole 49 which receives the hollow pin, is located above the hole 49 and in communication therewith. The cavity 51 houses the fission product trap 37.

An inverted cup-shaped filter 53, which is a part of the trap 37, is disposed above the junction between the cavity 51 and the hole 49. The filter 53 rests upon a graphite cover 55 and a stainless steel screen 57. The screen 57 and the cover 55 are secured to the bottom of the trap 37, as by screws 59. The filter 53 is made of a material, such as porous graphite, having a porosity which prevents solid particles from being carried out of the fuel element 11 with the purge gas exit stream.

The fission product trap 37 (as best seen in FIGURE 3) consists of a generally cylindrical piece of graphite proportioned to fit within the cavity 51 and having an indentation in its bottom surface in which the filter 53 is seated. A plurality of radially inwardly extending slots 61 are machined in the outer surface and extend the length of the trap 37. These slots 61 are filled with charcoal which removes fission products, such as iodine, bromine, tellurium, cesium and barium from the purge gas stream. The top of the trap 37 is closed by a piece of graphite cloth 63 which also serves as a gasket between the coupling element 35 and the lower part of the bottom connector 23.

In the fuel element 11, the purge gas flow is radially inward from the entire lateral surface of the body section 13 to the bore 15, downward through the annular passageway 29 to the bottom connector 23, through the charcoal fission-product trap 37, and out of the fuel element through the filter 53. From the filter 53 the purge stream passes through the hollow supporting pin (not shown) to a manifold system in the reactor core support plate (not shown) and thence to a fission product trapping system outside the nuclear reactor. It can be seen that, so long as the external fission product trapping system is maintained at a lower pressure than the pressure of the coolant stream in the reactor core, a continuous inward purge flow of coolant gas is maintained.

As best seen in FIGURE 2, each of the fuel chambers 17 is non-circular in cross section, having a more or less wedge shape and being radially oriented. Each fuel chamber 17 is spaced the same distance from the outer surface of the body section 13. The dense graphite from which the body section 13 is preferably constructed has a predetermined porosity to gas. The spacing of the fuel chambers 17 from the outer surface of the body section 13 and the purge flow rate are interdependent. The purge flow rate is dependent upon a number of factors including the porosity of the graphite, the wall thickness of the body section 13 and the pressure differential.

With the chamber 17 spaced about ¼ inch from the outer surface, the minimum purge flow rate of gas necessary to keep fission-product contamination in the main gas coolant stream below a desired limit can be calculated. For a cylindrical body section 13 having a length of about 15½ feet and a diameter of about 4½ inches, wherein helium is the intended coolant, a purge flow between about ¼ pound and ¾ pound of helium per hour per fuel element provides the desired inward rate of flow. Generally, a flow rate of between about $3 \times 10^{-4}$ and $1 \times 10^{-3}$ pounds of helium per square inch of surface area per hour is considered adequate. For a pressure differential of about 5 p.s.i. across a wall thickness of 1½ inches, the dense graphite should have a porosity between about $7.5 \times 10^{-2}$ and $1 \times 10^{-2}$ cm.$^2$/sec., measured with helium at room temperature and ½ atm. pressure. Moreover, the graphite should have as many pores as possible near the average value, with as few as possible very small pores.

The non-circular shape of the fuel chamber 17 improves the heat transfer characteristics of the fuel element 11. The thermal conductivity ($k$) of graphite measured in B.t.u./(hour) (sq. ft.) (°F./ft.) is about 95. Nuclear fuel material in packed bed form has a $k$ of about 2, whereas a graphite matrix pressed compact has a $k$ of about 15. Therefore, if the average distance which heat must travel from any fuel particle in a fuel chamber to the outer surface of the fuel element (where transfer to the coolant stream occurs) includes a maximum length of travel in the graphite body section 13 and a minimum length of travel in the body of nuclear fuel material 19, the heat transfer characteristics of the fuel element 11 is improved. By forming the fuel chambers 17 with non-circular cross sections, the average distance from a point in the body of nuclear fuel 19 to the graphite chamber wall is less than that in a cylindrical fuel chamber and consequently the heat transfer is more efficient.

The fuel chambers 17 may be filled with any suitable type of body of nuclear fuel material 19, as for example, a packed bed of nuclear fuel particles. However, it has been found that conduction of heat from the fuel to the fuel element body section 13, viz, the wall that forms the fuel element chamber 17, can be improved by filling in the void spaces inherently present in a packed bed of particles with a material having good thermal conductivity.

In the embodiment shown in FIGURES 1, 2 and 4, the body of nuclear fuel material 19 comprises a paste-like composition of nuclear fuel particles 65 and a viscous liquid having good thermal conductivity. The nuclear fuel particles 65 may be either coated or uncoated. Any suitable viscous liquid may be used; however, a mixture of graphite and coal tar pitch is preferred. The paste is squeezed into the fuel chambers 17 under pressure, using any suitable type of filling equipment. The amorphous nature of the paste assures excellent contact between the body of nuclear fuel material 19 and the inner wall of the fuel chamber 17.

After all the fuel chambers 17 in the body section 13 have been filled, the body section is preferably treated to carbonize the pitch and remove any volatile substances contained therein before it is used in a nuclear reactor. Suitable treatment can be accomplished by heating the body section 13 to a temperature of about 1800° C. over a period of about 20 hours.

Although there are not critical limits on the percent of the volume of each fuel chamber 17 which the particles 65 in the paste should occupy, it is preferred that the nuclear fuel particles 65 in the completed fuel element 11 occupy about 70 percent of the volume of the fuel chambers 17, with the remaining 30 percent being filled by the pitch-graphite mixture.

The following example illustrates one method of making a fuel element of the type described just above. This example should be understood to in no way limit the scope of the invention which is defined in the appended claims.

*Example 1*

A generally cylindrical fuel element 11 of a type adapted for use in a high temperature reactor using helium as a coolant, such as the HTGR, is made having a diameter of 4½ inches. The top reflector 21 and bottom connector 23 are machined from cylindrical sections of reactor grade graphite. The spacer ring 31 is dimensioned to have a diameter of about 4.70 inches.

The graphite body section 13 is extruded using conventional extrusion techniques for graphite. The extrusion charge comprises about 90 percent by weight graphite flour, such as National Carbon GP 38, together with 10 percent coal tar pitch. The graphite flour and pitch are thoroughly mixed to a uniform texture and then extruded at 15,000 p.s.i. and 300 C. The extruded annular body section 13 has an outer diameter of 4½ inches, an internal bore of 1½ inches and a length of about 15 feet, 10 inches. Twelve radially disposed fuel chambers 17 are provided in the extrusion, on 30° center lines. The fuel chambers 17 have cross sections which are wedge-shaped and which measure about ¾ inch long in their longest dimension and about ⅜ inch at their widest point. The extrusion is baked at 900° C. for 25 hours and then the temperature is slowly raised to 2600° C., over a span of about ten hours, to effect graphitization.

The extrusion has a gas permeability to helium, at room temperature, of about $5 \times 10^{-1}$ cm.$^2$/sec. To lower the porosity to the desired level of about $5 \times 10^{-2}$ cm.$^2$/sec., the extrusion is impregnated with a mixture of furfuryl alcohol and maleic anhydride in a ratio of 10 moles to one mole, respectively. Ethylcellulose, in an amount of about 13 weight percent of the mixture, is added to increase the viscosity of the resultant mixture to about 10,000 cp. The extrusion is outgassed for 5 hours and then immersed in the impregnant for 24 hours under about 10 atmospheres pressure of helium.

The impregnated extrusion is removed, wiped clean and then slowly baked in a helium atmosphere to carbonize the impregnant. The baking is carried out by slowly increasing the temperature to 1000° C. over a 2 day period. Graphitization is next effected by passing the extrusion through a furnace having a 2 foot long temperature zone at 2800° C. The speed of travel is such that each part of the extrusion is heated for 30 minutes. The extrusion is then machined to provide the internal threads 25, 27.

A paste is made of fuel particles 65, graphite and coal tar pitch. Fuel particles 65 of thorium dicarbide and enriched uranium dicarbide (in a 10:1 ratio thorium to uranium) are used which have an average diameter of about 700 microns, including a 100 micron thick coating of pyrolytic carbon. Graphite, such as Speer Carbon No. 780 S, is used having a particle size no longer than about 40 microns. The paste components are mixed in the following ratio of parts by weights: 85 parts coated fuel particles, 5 parts graphite and 10 parts coal tar pitch. The fuel particles 65 occupy about 70 volume percent of the paste.

The chambers 17 are filled with the paste, and the body section 13 is baked by heating to about 1800° C. over a period of about 20 hours to drive off volatiles in the coal tar pitch. The body section 13 is now ready for assembly with the rest of the components, which are manufactured by standard machining methods.

The fission-product trap 37 is fitted into the bottom connector 23 and the coupling element 35 and associated parts assembled thereto. All the threads are thinly coated with graphite cement to assure tight connections. The body section 13 is screwed onto the coupling element 35, and the moderator 28 inserted. Cylindrical pieces of sintered BeO having a density of about 2.9 grams per cc. are used which have length of about 10¼ inches. The diameter of the BeO pieces are about 1.42 inches and provide an annular passageway 29 about 0.040 inch wide. Insertion of the disc 33 and assembly of the top reflector 21 completes the fuel element 11.

Comparison of the fuel element 11 versus a similar fuel element of the same size, shape, fuel content and materials of construction, but which utilizes a packed bed of fuel particles in cylindrical fuel chambers shows that the fuel element 11 is superior. To transfer a given quantum of heat to a passing helium coolant stream, the comparative fuel element requires a fuel temperature of about 1600° C., whereas the fuel element 11 requires a fuel temperature of only about 1500° C. These improved heat transfer characteristics, which result in fuel savings, are considered to be definitely advantageous.

Although because of their increased heat transfer characteristics the use of fuel chambers having non-circular cross sections are preferred, a fuel element having satisfactory heat transfer characteristics may be provided using fuel chambers of circular cross section. Such a fuel element may also incorporate a central spine of moderator material. A fuel element 81 of this design is illustrated in FIGURES 6 and 7.

Fuel element 81 utilizes a top reflector 83 and bottom connector 85 of essentially the same design as those parts of the fuel element 11 hereinbefore described. A body section 87 is disposed intermediate the top reflector 83 and the bottom connector 85 which is of a design different from that of the fuel element 11. The body section 87 is simple in design and incorporates a greater volume percentage of beryllium moderator than the body section 13 of fuel element 11.

The body section 87 comprises an annulus 89 which is made of a moderating material, preferably graphite, and which has formed therein a plurality of longitudinally extending, cylindrical fuel chambers 91. The annulus 89 has a fairly large central bore 93 in which there is a central spine 95 of a beryllium material which spine is proportioned to provide an annular purge gas passageway 97. The annulus 89 is susceptible of simple construction. For example, it can be extruded with the fuel chambers 91 and the bore 93 formed therein; alternately, it can be machined from a cylinder of graphite.

The fuel chambers 91 may be filled with any suitable type of nuclear fuel, as for example, one of the types previously discussed with reference to the fuel chambers 17. However, the fuel chambers 91, as illustrated, are preferably filled with a packed bed of spherical fuel particles 99.

One preferred embodiment of the fuel element 81 has an overall length of about 20 feet. The body section 87 is about 15.75 feet long, has an outer diameter of about 4.5 inches and includes a pair of spacer rings (not shown) of outer diameters of about 4.69 inches. As previously stated, the upper reflector 83 and the bottom connector 85 are essentially duplicates of the like parts of the fuel element 11. The inner diameter of the central bore 93 is about 2.5 inches so the annulus 89 is about 1 inch thick.

Twelve fuel chambers 91 each one-half inch in diameter are spaced at 30° intervals on a circular center line of 3½ inches diameter. Operation of the fuel element 81 is contemplated in a nuclear reactor wherein the pressure differential between the coolant at the outer surface of the annulus 89 and the bore 93 is about 5 p.s.i. Accordingly, the graphite annulus 89 has a porosity of about $5 \times 10^{-2}$ cm.²/sec. of helium, measured at room temperature at one-half atmosphere pressure. The pore spectrum of the graphite annulus 89 is as previously described, a majority of pores being about average size.

The spine 95 is made of stacked cylindrical blocks of beryllium oxide of a density of about 2.9 grams per cc. which blocks have been cold-pressed and then sintered. The diameters of the BeO pieces measure about 2.42 inches and thus provide an annular purge gas passageway 97 about 0.040 inch wide. Each of the 12 fuel chambers 91 is filled with a packed bed of spherical fuel particles 99 of uranium carbide and thorium carbide, between about 350 microns to about 700 microns in diameter, including an outer coating about 100 microns thick of pyrolytic carbon. The particles in the packed bed occupy about 70 percent of the volume of the fuel chambers 91. The ratio between thorium and uranium fuel particles is about 10 to 1, thorium to uranium.

The above illustrated fuel element combines economy of fabrication with efficient performance. It is considered to be well-suited for use in a high temperature, gas-cooled nuclear reactor operating at high power density and near-breeding conditions. The fuel element design incorporates into a 4.5 inch diameter fuel element a proportionally high amount of nuclear fuel together with a relatively high percentage of beryllium moderator while retaining acceptable heat transfer characteristics. The use of packed beds of fuel particles facilitates loading of the fuel element 81 and reprocessing of the fuel.

It has been found that fuel elements having slightly different designs prove somewhat superior in certain aspects of performance when used with fuels that release a high percentage of their fission products. However, it should be understood that the previously described designs are not unsuitable for use with such fuels. For example, the fuel chambers 91 in the fuel element 81 can be filled with minute particles of nuclear fuel mixed together with fine particles of a moderator, such as graphite, to provide a fuel element which gives satisfactory performance while releasing a high percentage of the fission products created.

In FIGURE 5 there is shown an alternate embodiment of fuel element 11 which incorporates a body of nuclear fuel material 19' which releases a high percentage of fission products. The body of nuclear fuel material 19' comprises a compact shaped to closely fit within the fuel chamber 17. The compact 19' comprises packets 67 of nuclear fuel granules and a compatible refractory substance, such as graphite, which packets are disposed in a supporting matrix 69 of a moderating material. Although any suitable refractory material having good moderating properties can be used, graphite is preferred. In the illustrated embodiment, the packets 67 are in the shape of spherical balls or peas; however, packets of any suitable shape may be used, such as rods, etc.

The nuclear fuel granules are of very small size, less than about 10 microns in their largest dimension, and preferably have an average size of about two microns. As a result of recoil, fission products are deposited in the porous graphite portion of the packets 67, outside the nuclear fuel granules. These fission products readily migrate into the supporting matrix 69 where they are picked up by the purge gas stream and are carried to the fission product trapping system.

The packets 67 may be made in any suitable manner. Likewise, any suitable nuclear fuels can be used; granules of both fissile and fertile materials may be used within the same packet. The percentages of the components in the packets 67 may be varied, as desired, using nuclear fuel anywhere up to about 50 percent of the weight of the final packets. Preferably, the packets 67 are made from a mixture in the following ratio: 30 percent by weight nuclear fuel granules, 60 percent by weight graphite and 10 percent by weight binder. These materials are thoroughly mixed, and a sufficient amount of a solvent for the binder is added to create a slurry. Any suitable carbonizable binder may be used, such as ethylcellulose, polyvinyl alcohol, etc. Agglomeration of spherical balls from the slurry is carried out using any suitable procedure.

Because one purpose of the packets 67 is to restrict recoil damage to the graphite therein, leaving the supporting matrix strong and dimensionally stable, it is important that the packets 67 have a certain minimum size. Likewise, to promote the uniform distribution of packets throughout the body of nuclear fuel 19' and to preserve the structural strength of the supporting matrix, the spherical packets should not be too large in size. The spherical packets 67 should have a diameter between $1/16$ inch and $1/4$ inch and preferably, between about $1/8$ inch and $1/4$ inch.

The packets 67 are mixed with suitable matrix-forming refractory material, preferably graphite, and the mixture is formed into compacts by any method suitable for forming nuclear fuel within a matrix. For example, the compacts may be hot-pressed or, they may be cold-pressed or extruded and then sintered. Although there is, of course, no lower limit to the volume percent of the compacts which may be occupied by the packets 67, to assure the compact has the desired structural strength, the packets 67 should occupy less than about 50 volume percent, and preferably, no more than about 30 volume percent.

The damage resulting from the fission product recoil from the nuclear fuel granules is substantially confined to the porous graphite in the packets 67, leaving the matrix 69 free from any significant recoil damage. Substantial recoil damage to the matrix 69 results in shrinkage of the graphite, producing a gap between the outer surface of the compact and the inner surface of the fuel chamber 17. The greater such a gap, the greater the consequent loss in heat transfer across it. The planned segregation of the high-releasing fuel granules within packets 67 avoids this potential heat transfer loss.

*Example II*

The procedure of Example I is repeated to produce a similar body section 13. Instead of filling the fuel chambers 17 with paste, bodies of nuclear fuel material 19' in the form of compacts of high-releasing fuel are used.

Packets 67 in the shape of spheres about $3/16$ inch in diameter are used. The packets 67 are made from granules of enriched uranium and thorium oxides having an average particle size about 5 microns and a maximum particle size less than 10 microns in their largest dimension. Particles of graphite (Speer Carbon No. 780 S) of similar size are used. These materials are dry-mixed together with ethylcellulose binder in the following ratios: 10 grams enriched uranium oxide, 200 grams thorium oxide, 60 grams graphite, and 20 grams ethylcellulose. Sufficient trichloroethylene to dissolve the ethylcellulose and produce a slurry is added to this mixture (about 20 ml. per gram ethylcellulose). Spheres are agglomerated from the slurry while slowly evaporating the solvent. The agglomeration process is carried out using standard techniques to produce spheres having a diameter about $3/16$ of an inch. These spheres are dried for about two hours at 200° C. to produce hard, spherical packets 67.

The packets 67 are dry-mixed with graphite and binder to form fuel compacts having 30 percent of the volume thereof occupied by the packets 67. A mixture in the following weight ratios is utilized: 55 grams fuel packets, 40 grams graphite, and 5 grams ethylcellulose. After dry-mixing, sufficient solvent is added, about two ml. trichloroethylene per gram ethylcellulose, to form a paste. The paste is lightly pressed to shape, dried and then formed, under about 2000 p.s.i., into wedge-shaped compacts of suitable dimensions to fit into the fuel chambers 17. After cold pressing, the compacts are sintered for about ten hours at 1800° C. to ready them for installation in the body section.

The sintered compacts are carefully fitted into the fuel chambers 17, filling all twelve of the chambers. The remainder of the fuel element is assembled as in Example I.

Comparison of this fuel element is made with a fuel element physically similar except for the bodies of nuclear fuel. The comparison fuel element has the same amount of nuclear fuel in the form of a compact of uncoated nuclear fuel carbide particles having an average diameter about 200 microns in a graphite matrix. Both fuel elements are operated under the same irradiation conditions for like periods of time utilizing helium purge flows of about ½ pound of helium per fuel element per hour.

Comparison of the external traps through which were passed the purge gas flows from each of the fuel elements shows significant differences. Particular attention is given to rare gases xenon and krypton which have isotopes of very high neutron capture cross section. Calculations show that the purge flow through the comparative fuel element removes only about 5 percent of these gaseous fission products from the fuel body section, whereas the purge flow through the fuel element made by the process set forth in Example II removes about 50 percent of the gaseous fission products which are created. Examination of the body section 13 shows that the fuel compacts retain their original dimensions and remain disposed in good heat transfer relation against the inner walls of the fuel chambers 17. The described fuel elements are considered excellently suited for use in gas-cooled nuclear reactors.

Several other fuel elements which are particularly designed for use with nuclear fuel which releases a high proportion of its fission products are illustrated in FIGURES 8 through 11. Each of these fuel elements utilizes a top reflector and a bottom connector similar in design to those incorporated into fuel element 11 and fuel element 81. However, as can be seen, there are differences in the body sections between each of these elements and the fuel element 11.

Illustrated in FIGURES 8 through 11, respectively, are fuel elements 101, 111, 121 and 131. Each of these fuel elements is designed for use in a high temperature, gas-cooled nuclear reactor capable of operating at high power densities. Each of these fuel elements has an outer body section of porous graphite through which a gas coolant can pass to reach a central purge passageway within the fuel element body section. Moreover, each of the fuel elements has an annular fueled region. In fuel elements 121 and 131 the fueled region is a complete annulus, whereas in fuel elements 101 and 111, as in the previously described fuel elements 11 and 81, the fueled region comprises a plurality of individual chambers which are spaced from one another within the boundaries of an annulus.

More specifically, fuel element 101, illustrated in FIGURE 8, comprises a generally cylindrical body section 103 of graphite. An intermediate section of the cylindrical body 103 constitutes an annular fueled section made up of five circular fuel chambers 105. Concentric with the outer surface of the cylindrical body 101 there is a central purge gas passageway 107.

The graphite body section 103 has a predetermined porosity to the coolant gas, as hereinbefore described, so that, when the fuel element 101 is disposed within an operating nuclear reactor, there will be a flow of purge gas through the entire lateral surface of the body section 103 radially inward into the purge passageway 107, whence it will be conducted to the internal fission product trap in the bottom connector. If desired, the fuel element body section 103 can be extruded and then impregnated, as hereinbefore described in Example I, to provide it with the desired gas porosity.

The five cylindrical fuel chambers 105 may be filled with fuel bodies in the form of compacts utilizing spherical packets 67, as hereinbefore described. The five, large diameter fuel chambers 105 cause an increase in fuel temperature which enhances the release of fission products from the fuel. Alternately, the fuel chambers 105 of the fuel element 101 may be, and preferably are, filled with a mixture of thorium oxide particles and uranium oxide particles, less than about 1 micron in particle size, dispersed within microfine graphite that is less than about 0.5 micron in particle size. This mixture is preferably used in the following ratio: about 10 parts by weight thorium to about 1 part by weight uranium to about 20 parts by weight graphite. Use of a packed body 109 of fine particles of nuclear fuel dispersed in micro-fine graphite results in release of a very high percentage of fission products.

Figure 9:
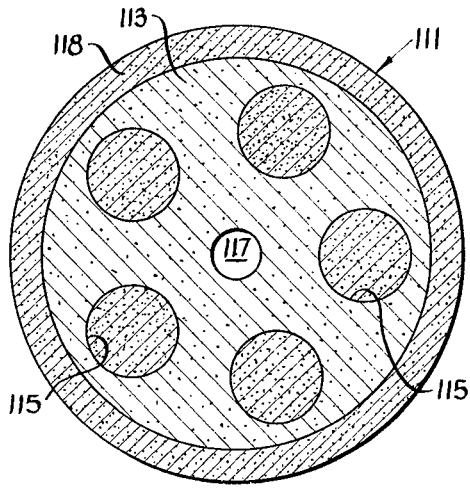

The fuel element 111, illustrated in FIGURE 9, is generally similar to the fuel element 101 and utilizes a proportionately smaller cylindrical, graphite body section 113 having therein an annular fueled region comprising five circular fuel chambers 115. The body section 113 has a central purge passageway 117 through which the radial inflow of purge gas from the lateral surface is conducted to a fission product trap in the bottom connector.

Disposed about the lateral surface of the body section 113 is a tightly-fitting graphite sleeve 118. This outer graphite sleeve 118 has a predetermined gas porosity. Use of the sleeve 118 avoids the necessity of treating the body section 113 to reduce its porosity to the desired level. Therefore, the body section 113 may have a relatively high gas porosity while the sleeve 118 is relied upon to regulate the inflow of purge gas and minimize the escape of fission products into the coolant stream. This relatively high gas porosity encourages fission product flow inward to the purge gas passageway 117. The fuel chambers 115 are preferably filled with packed beds 119 of fine nuclear fuel particles dispersed in microfine graphite, as described with respect to fuel element 101.

Figure 10:
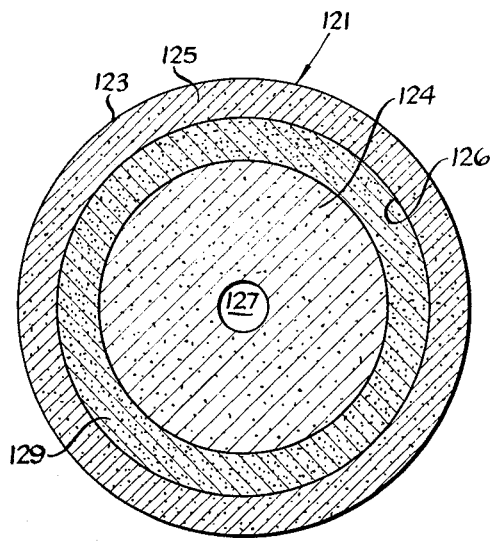

In fuel element 121, illustrated in FIGURE 10, a body section 123 is made of two separate graphite pieces, an inner spine 124 and an outer graphite sleeve 125. The outer sleeve 125 is secured to a stop reflector and a bottom connector in a manner similar to the body section 113 of fuel element 11. The graphite spine 124 is suitably secured concentrically within the sleeve 125 to provide therebetween an annular fuel region in the form of annular chamber 126. The spine 124 is cylindrical in shape and has a concentric, inner purge gas passageway 127 so that coolant gas flows radially inward from the entire lateral surface of the outer sleeve 125 through the fueled region and the spine 124 to the purge gas passageway 127, which leads to an internal fission product trap in the bottom connector of the fuel element 121.

The graphite spine 124 is made of relatively porous, inexpensive graphite, sufficiently dense to have good moderating properties, but porous enough to encourage ready diffusion of fission products radially inward to the central purge gas passageway 127 rather than outward through the sleeve 125. The annular fuel chamber 126 is filled with a suitable high-releasing nuclear fuel. Preferably, the fuel chamber 126 is filled with a plurality of rings 129 of nuclear fuel material in a graphite matrix, similar to the compacts 19'. The rings 129 are about 6 inches high and have outer diameters less than about 10 mils smaller than the inner diameter of the sleeve 125 to provide adequate heat transfer. Nuclear fuel oxide particles less than about 10 microns in particle size in a paste similar to that previously described with respect to fuel bodies 19 may also be used.

Figure 11:
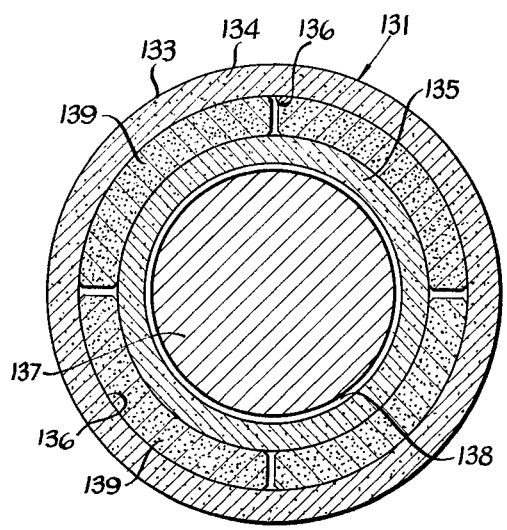

In the fuel element 131, illustrated in FIGURE 11, a body section 133 is made of two concentric tubes or sleeves of graphite, 134 and 135. The outer sleeve 134 is structurally secured to a top reflector and a bottom connector in a manner similar to the body section 13 of fuel element 11. The inner sleeve 135 is suitably secured concentrically within the outer sleeve 134 to provide therebetween an annular fueled region in the form of an annular chamber 136. A central moderating spine 137 is disposed within the inner sleeve 135 and is preferably made of a material, such as beryllium oxide, which has good moderating properties.

The outer diameter of the spine 137 is proportioned so as to provide an annular purge gas passageway 138 between its outer surface and the adjacent inner surface of the sleeve 135. In operation, purge gas flow is radially inward from the entire lateral surface of the outer sleeve 134, through the sleeve 134, through the fuel chamber 136, through the inner sleeve 135 and thence downward in the annular passageway 138 to an internal fission product trap in the bottom connector of the fuel element 131. The inner sleeve is significantly more porous than the outer sleeve to encourage the diffusion of fission products from the fuel chamber 136 inward to the purge gas passageway 138.

As in the illustrated fuel element 131, the fuel chamber 136 is preferably filled with four fuel compacts 139, in the form of annular segments, fairly closely proportioned to fill the gap between the adjacent walls of the sleeves 134 and 135, which gap constitutes the annular fuel chamber 136. Fuel compacts 139 which incorporate a suitable high-releasing nuclear fuel may be used. Preferably, the compacts 139 are made in a manner similar to fuel bodies 19', illustrated in FIGURE 5, which utilize packets containing the high-releasing nuclear fuel particles which packets are disposed within a supporting matrix. Alternately, the annual fuel chamber 136 could, if desired, be filled with a packed bed including high-releasing nuclear fuel similar to that preferably used in fuel elements 101, 111, and 121.

Various of the features of the invention are set forth in the appended claims.

What is claimed is:

1. A fuel element for a gas-cooled nuclear reactor which fuel element comprises an elongated body section formed of graphite having a predetermined gas porosity having a central bore therewithin, said elongated body section having a plurality of longitudinally extending fuel chambers, each of said longitudinal fuel chambers having a non-circular cross section and each of said chambers being spaced at least a preselected distance from the outer surface of the elongated body section, a compact of nuclear fuel material disposed within each of said fuel chambers, said compact comprising a matrix of graphite disposed in close relation with said dense graphite body section so that there is good heat transfer therebetween and a plurality of packets dispersed throughout said matrix, which packets include a mixture of granules of uncoated nuclear fuel oxides of a particle size less than about 10 microns and graphite flour, said packets being in the form of balls of a diameter between about ⅛ and ¼ inch, and said balls occupying no more than about 30 volume percent of said compact, and means connected to said elongated body section for supporting the fuel element in the core of a nuclear reactor and for providing a purge gas flow through the fuel element.

2. In a fuel element for a nuclear reactor, which fuel element has a body section formed of a refractory material of a high thermal conductivity and which also has means for providing a purge flow of gas through the body section, a body of nuclear fuel material disposed within the fuel element body section, which body of nuclear fuel comprises a matrix of moderator material and a plurality of packets dispersed within said matrix, said packets including a mixture of nuclear fuel granules of a particle size less than about 10 microns and a refractory substance, whereby fission products from said nuclear fuel granules are released into said refractory substance in said packets and said matrix of moderator material remains free from recoil damage and dimensionally stable.

3. The fuel element of claim 2, wherein said packets are at least about ⅛ inch in their shortest dimension.

4. The fuel element of claim 2, wherein said packets occupy no more than about 50 volume percent of said body of nuclear fuel.

5. The fuel element of claim 2, wherein said packets occupy no more than about 30% of the volume of said body of nuclear fuel.

6. The fuel element of claim 5, wherein said nuclear fuel granules are composed of uncoated nuclear fuel oxides and said refractory substance is graphite flour, and said packets are in the form of balls of a diameter between about ⅛ and ¼ inch.

7. A fuel element for a gas-cooled nuclear reactor which fuel element comprises an elongated body section formed of refractory material having a substantial predetermined gas permeability, said elongated body section having formed therein an annular region containing nuclear fuel material, said elongated body section also having formed therein a purge gas passageway which is disposed inward of said annular region relative to the outer surface of said elongated body section, said nuclear fuel material being designed to release at least about 50 percent of the gaseous fission products formed therein, and means connected to said elongated body section for providing a purge gas flow radially inward from the entire outer surface of said permeable body section past each of said fuel chambers and out of said body section through said purge gas passageway.

8. The fuel element of claim 7, wherein said purge gas passageway is of annular shape defined by a central bore in said body section and a spine of moderating material disposed within said central bore.

9. The fuel element of claim 7, wherein said nuclear fuel material is disposed within a plurality of longitudinally extending fuel chambers disposed within said annular region.

10. A fuel element for a gas-cooled nuclear reactor which fuel element comprises an elongated cylindrical section formed of refractory material having a relatively high gas permeability, said elongated cylindrical section also having formed therein a central bore which serves as a purge gas passageway, an outer sleeve of refractory material having a predetermined gas permeability less than that of said cylindrical section, said outer sleeve having an inner diameter substantially larger than the outer diameter of said cylindrical section, means positioning said outer sleeve in surrounding spaced relation about said cylindrical section to provide an annular fuel chamber therebetween, and nuclear fuel material disposed within said annular fuel chamber which material is designed to release at least about 50 percent of the gaseous fission products formed therein.

11. The fuel element of claim 10, wherein a central cylindrical spine is disposed within said central bore defining an annular purge gas passageway therebetween.

References Cited by the Examiner

UNITED STATES PATENTS

| | | | |
|---|---|---|---|
| 2,917,443 | 12/1959 | Grebe | 176—90 |
| 3,028,330 | 4/1962 | Justheim et al. | 176—90 |
| 3,034,975 | 5/1962 | Beurtheret | 176—90 |
| 3,076,753 | 2/1963 | Bell | 176—61 |
| 3,133,000 | 5/1964 | Hartnell-Beavis | 176—90 |
| 3,135,665 | 6/1964 | Koutz et al. | 176—71 |
| 3,142,625 | 7/1964 | Wellborn | 176—32 |
| 3,146,173 | 8/1964 | Fortescue et al. | 176—71 |
| 3,146,281 | 8/1964 | Krystyniak et al. | 264—21 |
| 3,156,747 | 11/1964 | Burke | 264—21 |
| 3,158,547 | 11/1964 | Smith | 176—90 |

FOREIGN PATENTS 794,901  5/1958  Great Britain.

L. DEWAYNE RUTLEDGE, *Primary Examiner.*

LEON D. ROSDOL, *Examiner.*

J. V. MAY, *Assistant Examiner.*